United States Patent
Narendra et al.

(10) Patent No.: US 9,741,027 B2
(45) Date of Patent: Aug. 22, 2017

(54) MEMORY CARD BASED CONTACTLESS DEVICES

(75) Inventors: Siva G. Narendra, Portland, OR (US);
Prabhakar Tadepalli, Karnatake (IN);
Thomas N. Spitzer, Portland, OR (US)

(73) Assignee: Tyfone, Inc., Portland, OR (US)

( * ) Notice: Subject to any disclaimer, the term of this patent is extended or adjusted under 35 U.S.C. 154(b) by 2197 days.

(21) Appl. No.: 12/002,317

(22) Filed: Dec. 14, 2007

(65) Prior Publication Data

US 2009/0152361 A1    Jun. 18, 2009

(51) Int. Cl.
*H05K 1/14*      (2006.01)
*G06Q 20/32*    (2012.01)
*G06Q 20/34*    (2012.01)
*G06Q 40/02*    (2012.01)

(52) U.S. Cl.
CPC .......... *G06Q 20/32* (2013.01); *G06Q 20/353* (2013.01); *G06Q 40/02* (2013.01)

(58) Field of Classification Search
CPC ........ H05K 1/144; H05K 7/142; H05K 3/368; H05K 5/0269; G06K 19/077; G06K 19/07743; G06K 19/0723; H04B 13/816; H04M 2250/14
USPC .......... 361/736–737, 814; 455/343.2–343.4, 455/574–575, 41.1, 558; 235/492–493
See application file for complete search history.

(56) References Cited

U.S. PATENT DOCUMENTS

| | | |
|---|---|---|
| 4,701,601 A | 10/1987 | Francini et al. |
| 4,786,791 A | 11/1988 | Hodama |
| 4,791,283 A | 12/1988 | Burkhardt |
| 4,864,109 A | 9/1989 | Minematsu et al. |
| 5,212,478 A | 5/1993 | Moseley |
| 5,378,887 A | 1/1995 | Kobayashi |
| 5,537,584 A | 7/1996 | Miyai et al. |
| 5,574,273 A | 11/1996 | Nakagawa et al. |
| 5,585,787 A | 12/1996 | Wallerstein |
| 5,629,981 A | 5/1997 | Nerlikar |
| 5,700,037 A | 12/1997 | Keller |
| 5,710,421 A | 1/1998 | Kokubu |
| 5,834,756 A | 11/1998 | Gutman et al. |
| 5,909,491 A | 6/1999 | Luo |

(Continued)

FOREIGN PATENT DOCUMENTS

| | | |
|---|---|---|
| DE | 3632294 A1 | 4/1988 |
| DE | 10054890 A1 | 4/2002 |

(Continued)

OTHER PUBLICATIONS

International Preliminary Report on Patentability and Written Opinion received for PCT Application No. PCT/US2010/025014, mailed on Sep. 9, 2011, 6 pages.

(Continued)

*Primary Examiner* — Tuan T Dinh
(74) *Attorney, Agent, or Firm* — Dana B. LeMoine

(57) ABSTRACT

A memory card compatible token includes a host interface, radio circuits to transmit signals and a controller to determine if the memory card access commands are for contactless devices attached to the memory card slot or general memory. User payment account information is stored in the contactless chip as part of the contactless devices. The radio circuits can be activated and deactivated by the user for signal transmission using the controller through a mobile computing device.

4 Claims, 13 Drawing Sheets

(56) References Cited

U.S. PATENT DOCUMENTS

| | | |
|---|---|---|
| 5,940,510 A | 8/1999 | Curry et al. |
| 5,949,880 A | 9/1999 | Curry et al. |
| 5,952,641 A | 9/1999 | Korshun |
| 5,955,961 A | 9/1999 | Wallerstein |
| 6,016,476 A | 1/2000 | Maes et al. |
| 6,021,944 A | 2/2000 | Arakaki |
| 6,039,260 A | 3/2000 | Eisele |
| 6,045,043 A | 4/2000 | Bashan et al. |
| 6,068,184 A | 5/2000 | Barnett |
| 6,105,013 A | 8/2000 | Curry et al. |
| 6,182,891 B1 | 2/2001 | Furuhashi et al. |
| 6,189,786 B1 | 2/2001 | Itou et al. |
| 6,206,293 B1 | 3/2001 | Gutman et al. |
| 6,219,439 B1 | 4/2001 | Burger |
| 6,223,954 B1 | 5/2001 | Carow |
| 6,223,984 B1 | 5/2001 | Renner et al. |
| 6,237,095 B1 | 5/2001 | Curry et al. |
| 6,250,557 B1 | 6/2001 | Forslund et al. |
| 6,315,195 B1 | 11/2001 | Ramachandran |
| 6,402,029 B1 | 6/2002 | Gangi |
| 6,481,623 B1 | 11/2002 | Grant et al. |
| 6,568,600 B1 | 5/2003 | Carpier et al. |
| 6,587,914 B2 | 7/2003 | Campardo |
| 6,588,660 B1 | 7/2003 | Buescher et al. |
| 6,592,044 B1 | 7/2003 | Wong et al. |
| 6,594,759 B1 | 7/2003 | Wang |
| 6,598,031 B1 | 7/2003 | Ice |
| 6,607,127 B2 | 8/2003 | Wong |
| 6,609,654 B1 | 8/2003 | Anderson et al. |
| 6,631,849 B2 | 10/2003 | Blossom |
| 6,636,833 B1 | 10/2003 | Flitcroft et al. |
| 6,669,487 B1 | 12/2003 | Nishizawa et al. |
| 6,705,520 B1 | 3/2004 | Pitroda et al. |
| 6,712,277 B2 | 3/2004 | Spencer |
| 6,715,679 B1 | 4/2004 | Infosino |
| 6,721,196 B1 | 4/2004 | Grassl |
| 6,747,547 B2 | 6/2004 | Benson |
| 6,764,005 B2 | 7/2004 | Cooper |
| 6,769,607 B1 | 8/2004 | Pitroda et al. |
| 6,805,288 B2 | 10/2004 | Routhenstein et al. |
| 6,811,082 B2 | 11/2004 | Wong |
| 6,836,843 B2 | 12/2004 | Seroussi et al. |
| 6,857,566 B2 | 2/2005 | Wankmueller |
| 6,882,900 B1 | 4/2005 | Terranova |
| 6,883,718 B1 | 4/2005 | Le et al. |
| 6,905,072 B2 | 6/2005 | Ramachandran |
| 6,907,123 B1 | 6/2005 | Schier |
| 6,908,030 B2 | 6/2005 | Rajasekaran et al. |
| 6,925,568 B1 | 8/2005 | Heinonen |
| 6,937,526 B2 | 8/2005 | Furukawa |
| 6,952,788 B2 | 10/2005 | Rommelmann et al. |
| 6,995,651 B2 | 2/2006 | Amtmann et al. |
| 7,059,520 B1 | 6/2006 | Shtesl |
| 7,088,246 B2 | 8/2006 | Fukuoka |
| 7,185,146 B2 | 2/2007 | Masuyama et al. |
| 7,221,473 B2 | 5/2007 | Jeran et al. |
| 7,281,101 B2 | 10/2007 | Mizushima et al. |
| 7,295,790 B2 | 11/2007 | Morimoto et al. |
| 7,333,062 B2 | 2/2008 | Leizerovich et al. |
| 7,350,717 B2 | 4/2008 | Conner et al. |
| 7,353,993 B2 | 4/2008 | Fujimoto |
| 7,410,102 B2 | 8/2008 | Winkler |
| 7,493,484 B2 | 2/2009 | Lee |
| 7,558,107 B2 | 7/2009 | Sakurai et al. |
| 7,558,110 B2 | 7/2009 | Mizushima et al. |
| 7,581,678 B2 | 9/2009 | Narendra et al. |
| 7,607,580 B2 | 10/2009 | Takita et al. |
| 7,673,080 B1 | 3/2010 | Yu et al. |
| RE41,352 E | 5/2010 | Wood, Jr. |
| 7,716,082 B1 | 5/2010 | Blalock |
| RE41,471 E | 8/2010 | Wood, Jr. |
| 7,789,303 B2 | 9/2010 | Fukasawa |
| 7,792,516 B2 | 9/2010 | Soderstrom |
| 7,828,214 B2 | 11/2010 | Narendra et al. |
| RE42,254 E | 3/2011 | Wood, Jr. |
| 7,898,994 B2* | 3/2011 | Zhao et al. ............. 370/311 |
| 7,933,571 B2 | 4/2011 | Black et al. |
| 7,941,197 B2 | 5/2011 | Jain et al. |
| 7,948,356 B2 | 5/2011 | Kawamura et al. |
| 7,954,715 B2 | 6/2011 | Narendra et al. |
| 7,954,716 B2 | 6/2011 | Narendra et al. |
| 7,954,717 B2 | 6/2011 | Narendra et al. |
| 7,961,101 B2 | 6/2011 | Narendra et al. |
| 7,991,158 B2 | 8/2011 | Narendra et al. |
| 8,072,331 B2 | 12/2011 | Narendra et al. |
| 8,083,145 B2 | 12/2011 | Narendra et al. |
| 8,091,786 B2 | 1/2012 | Narendra et al. |
| 2001/0002035 A1 | 5/2001 | Kayanakis |
| 2001/0006902 A1* | 7/2001 | Ito ........................ 455/558 |
| 2001/0013551 A1 | 8/2001 | Ramachandran |
| 2001/0034246 A1* | 10/2001 | Hutchison et al. ........ 455/557 |
| 2002/0007434 A1 | 1/2002 | Campardo |
| 2002/0043566 A1 | 4/2002 | Goodman et al. |
| 2002/0044043 A1 | 4/2002 | Chaco et al. |
| 2002/0095588 A1 | 7/2002 | Shigematsu et al. |
| 2002/0096570 A1 | 7/2002 | Wong et al. |
| 2002/0099665 A1 | 7/2002 | Burger et al. |
| 2002/0130187 A1 | 9/2002 | Berg et al. |
| 2002/0138422 A1 | 9/2002 | Natsuno |
| 2002/0138735 A1 | 9/2002 | Felt et al. |
| 2002/0139849 A1 | 10/2002 | Gangi |
| 2002/0148892 A1 | 10/2002 | Bardwell |
| 2002/0153424 A1 | 10/2002 | Li |
| 2002/0158747 A1 | 10/2002 | McGregor et al. |
| 2002/0178124 A1 | 11/2002 | Lewis |
| 2002/0180584 A1 | 12/2002 | McGregor et al. |
| 2002/0186845 A1 | 12/2002 | Dutta et al. |
| 2003/0025939 A1 | 2/2003 | Jeran et al. |
| 2003/0028481 A1 | 2/2003 | Flitcroft et al. |
| 2003/0052168 A1 | 3/2003 | Wong |
| 2003/0057278 A1 | 3/2003 | Wong |
| 2003/0061168 A1 | 3/2003 | Routhenstein |
| 2003/0079096 A1 | 4/2003 | Murakami |
| 2003/0080183 A1 | 5/2003 | Rajasekaran et al. |
| 2003/0085288 A1 | 5/2003 | Luu |
| 2003/0115126 A1 | 6/2003 | Pitroda |
| 2003/0128124 A1 | 7/2003 | Amtmann et al. |
| 2003/0159050 A1 | 8/2003 | Gantman et al. |
| 2003/0200180 A1 | 10/2003 | Phelan, III et al. |
| 2003/0220876 A1 | 11/2003 | Burger et al. |
| 2003/0231550 A1 | 12/2003 | MacFarlane |
| 2004/0006654 A1 | 1/2004 | Bando |
| 2004/0027881 A1 | 2/2004 | Furukawa |
| 2004/0030660 A1 | 2/2004 | Shatford |
| 2004/0035942 A1 | 2/2004 | Silverman |
| 2004/0050930 A1 | 3/2004 | Rowe |
| 2004/0058705 A1 | 3/2004 | Morgan et al. |
| 2004/0064612 A1 | 4/2004 | Pinto et al. |
| 2004/0065733 A1 | 4/2004 | Fukuoka |
| 2004/0077372 A1 | 4/2004 | Halpern |
| 2004/0087339 A1 | 5/2004 | Goldthwaite et al. |
| 2004/0094624 A1 | 5/2004 | Fernandes et al. |
| 2004/0133787 A1 | 7/2004 | Doughty et al. |
| 2004/0162932 A1 | 8/2004 | Mizushima et al. |
| 2004/0177045 A1 | 9/2004 | Brown |
| 2004/0188519 A1 | 9/2004 | Cassone |
| 2004/0199469 A1 | 10/2004 | Barillova et al. |
| 2004/0227859 A1 | 11/2004 | Liang |
| 2004/0243785 A1 | 12/2004 | Shanmugasundaram et al. |
| 2004/0243806 A1 | 12/2004 | McKinley et al. |
| 2004/0250037 A1 | 12/2004 | Takemura et al. |
| 2004/0251303 A1 | 12/2004 | Cooper |
| 2004/0255145 A1 | 12/2004 | Chow |
| 2005/0006462 A1 | 1/2005 | Rouille et al. |
| 2005/0017068 A1 | 1/2005 | Zalewski et al. |
| 2005/0022002 A1 | 1/2005 | Poisner |
| 2005/0029349 A1 | 2/2005 | McGregor et al. |
| 2005/0038736 A1 | 2/2005 | Saunders |
| 2005/0039027 A1 | 2/2005 | Shapiro |
| 2005/0044044 A1 | 2/2005 | Burger et al. |
| 2005/0050367 A1 | 3/2005 | Burger et al. |
| 2005/0052924 A1 | 3/2005 | Nishizawa et al. |
| 2005/0060586 A1 | 3/2005 | Burger et al. |
| 2005/0071282 A1 | 3/2005 | Lu et al. |

(56) References Cited

U.S. PATENT DOCUMENTS

| | | |
|---|---|---|
| 2005/0077349 A1 | 4/2005 | Bonalle et al. |
| 2005/0086421 A1 | 4/2005 | Nassar |
| 2005/0092830 A1 | 5/2005 | Blossom |
| 2005/0108096 A1 | 5/2005 | Burger et al. |
| 2005/0109838 A1 | 5/2005 | Linlor |
| 2005/0109841 A1 | 5/2005 | Ryan et al. |
| 2005/0116026 A1 | 6/2005 | Burger et al. |
| 2005/0121512 A1 | 6/2005 | Wankmueller |
| 2005/0122209 A1 | 6/2005 | Black |
| 2005/0127164 A1 | 6/2005 | Wankmueller |
| 2005/0127166 A1 | 6/2005 | Minemura |
| 2005/0133606 A1 | 6/2005 | Brown |
| 2005/0136964 A1 | 6/2005 | Le Saint et al. |
| 2005/0168339 A1 | 8/2005 | Arai et al. |
| 2005/0177724 A1 | 8/2005 | Ali et al. |
| 2005/0197859 A1 | 9/2005 | Wilson et al. |
| 2005/0204077 A1 | 9/2005 | Kou |
| 2005/0204092 A1 | 9/2005 | Masuyama et al. |
| 2005/0212657 A1 | 9/2005 | Simon |
| 2005/0223143 A1 | 10/2005 | Kang et al. |
| 2005/0224589 A1* | 10/2005 | Park et al. ............... 235/492 |
| 2005/0240778 A1 | 10/2005 | Saito |
| 2005/0246546 A1 | 11/2005 | Takagi et al. |
| 2005/0253687 A1 | 11/2005 | Martinez et al. |
| 2005/0258245 A1 | 11/2005 | Bates et al. |
| 2005/0268058 A1 | 12/2005 | Drasnin et al. |
| 2005/0268330 A1 | 12/2005 | Di Rienzo |
| 2006/0011731 A1 | 1/2006 | Anders et al. |
| 2006/0027655 A1 | 2/2006 | Smets et al. |
| 2006/0045555 A1 | 3/2006 | Morimoto et al. |
| 2006/0064537 A1 | 3/2006 | Oshima |
| 2006/0074813 A1* | 4/2006 | Saunders ............... 705/67 |
| 2006/0077039 A1 | 4/2006 | Ibi et al. |
| 2006/0097851 A1 | 5/2006 | Amtmann et al. |
| 2006/0124755 A1 | 6/2006 | Ito |
| 2006/0169778 A1 | 8/2006 | Chung |
| 2006/0172606 A1 | 8/2006 | Irisawa |
| 2006/0186209 A1 | 8/2006 | Narendra et al. |
| 2006/0208066 A1* | 9/2006 | Finn et al. ............... 235/380 |
| 2006/0219776 A1* | 10/2006 | Finn ............... 235/380 |
| 2006/0226217 A1 | 10/2006 | Narendra et al. |
| 2006/0268764 A1 | 11/2006 | Harris |
| 2006/0279413 A1 | 12/2006 | Yeager |
| 2007/0033334 A1 | 2/2007 | Katayama et al. |
| 2007/0076877 A1 | 4/2007 | Camp et al. |
| 2007/0108280 A1 | 5/2007 | Li et al. |
| 2007/0110404 A1 | 5/2007 | Ching et al. |
| 2007/0145135 A1 | 6/2007 | Jogand-Coulomb et al. |
| 2007/0145152 A1 | 6/2007 | Jogand-Coulomb et al. |
| 2007/0195458 A1 | 8/2007 | Sawai et al. |
| 2007/0205864 A1 | 9/2007 | Mutti et al. |
| 2007/0257797 A1 | 11/2007 | Rancien et al. |
| 2007/0293202 A1 | 12/2007 | Moshir et al. |
| 2008/0046649 A1 | 2/2008 | Ito |
| 2008/0065830 A1 | 3/2008 | Aoki et al. |
| 2008/0068173 A1 | 3/2008 | Alexis et al. |
| 2008/0073436 A1 | 3/2008 | Nishizawa et al. |
| 2008/0136619 A1 | 6/2008 | Moran |
| 2008/0147950 A1 | 6/2008 | Chen |
| 2008/0148077 A1 | 6/2008 | Lee et al. |
| 2008/0153416 A1 | 6/2008 | Washiro |
| 2008/0186174 A1 | 8/2008 | Alexis et al. |
| 2008/0214111 A1 | 9/2008 | Moshir et al. |
| 2008/0244208 A1 | 10/2008 | Narendra et al. |
| 2008/0279381 A1 | 11/2008 | Narendra et al. |
| 2008/0307128 A1 | 12/2008 | Amron et al. |
| 2008/0311849 A1 | 12/2008 | Washiro |
| 2008/0318535 A1 | 12/2008 | Black et al. |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0108063 A1 | 4/2009 | Jain et al. |
| 2009/0150610 A1 | 6/2009 | Hsu et al. |
| 2009/0199283 A1 | 8/2009 | Jain |
| 2009/0250521 A1 | 10/2009 | Fujita et al. |
| 2009/0265552 A1 | 10/2009 | Moshir et al. |
| 2009/0270127 A1 | 10/2009 | Kakimoto |
| 2009/0290582 A1 | 11/2009 | Suenaga et al. |
| 2009/0298540 A1 | 12/2009 | Narendra et al. |
| 2009/0315667 A1 | 12/2009 | Kawamura et al. |
| 2010/0033307 A1 | 2/2010 | Narendra et al. |
| 2010/0033310 A1 | 2/2010 | Narendra et al. |
| 2010/0049878 A1 | 2/2010 | Yu et al. |
| 2010/0213265 A1 | 8/2010 | Narendra et al. |
| 2011/0053644 A1 | 3/2011 | Narendra et al. |
| 2011/0073663 A1 | 3/2011 | Narendra et al. |
| 2011/0073665 A1 | 3/2011 | Narendra et al. |
| 2011/0077052 A1 | 3/2011 | Narendra et al. |
| 2011/0110404 A1 | 5/2011 | Washiro |
| 2011/0171996 A1 | 7/2011 | Narendra et al. |
| 2011/0180610 A1 | 7/2011 | Narendra et al. |
| 2011/0220726 A1 | 9/2011 | Narendra et al. |
| 2011/0223972 A1 | 9/2011 | Narendra et al. |
| 2011/0269438 A1 | 11/2011 | Narendra et al. |
| 2011/0271044 A1 | 11/2011 | Narendra et al. |
| 2011/0272468 A1 | 11/2011 | Narendra et al. |
| 2011/0272469 A1 | 11/2011 | Narendra et al. |

FOREIGN PATENT DOCUMENTS

| | | |
|---|---|---|
| EP | 161060 A1 | 11/1985 |
| EP | 0818757 A2 | 1/1998 |
| EP | 1014290 A2 | 6/2000 |
| EP | 1117068 A1 | 7/2001 |
| EP | 1178450 A2 | 2/2002 |
| EP | 1189465 A1 | 3/2002 |
| EP | 1291748 A2 | 3/2003 |
| GB | 2316908 A | 3/1998 |
| JP | 04-102112 A | 4/1992 |
| JP | 2000-010668 A | 1/2000 |
| JP | 2005-018671 A | 1/2005 |
| JP | 2007-199847 A | 8/2007 |
| JP | 2007-328689 A | 12/2007 |
| TW | 200905471 | 2/2009 |
| TW | 201020934 A1 | 6/2010 |
| TW | 201023662 A1 | 6/2010 |
| TW | I336449 | 1/2011 |
| TW | 201126422 A1 | 8/2011 |
| WO | 96/26500 A1 | 8/1996 |
| WO | 98/12674 A2 | 3/1998 |
| WO | 00/14678 A1 | 3/2000 |
| WO | 01/88659 A3 | 1/2003 |
| WO | 03/029942 A2 | 4/2003 |
| WO | 03/077473 A1 | 9/2003 |
| WO | 03/081519 A2 | 10/2003 |
| WO | 2004/012352 A1 | 2/2004 |
| WO | 2004/095169 A2 | 11/2004 |
| WO | 2005/027030 A1 | 3/2005 |
| WO | 2005/119607 A2 | 12/2005 |
| WO | 2005/119608 A1 | 12/2005 |
| WO | 2005/119607 A3 | 5/2006 |
| WO | 2006/091709 A2 | 8/2006 |
| WO | 2006/091709 A3 | 12/2006 |
| WO | 2006/108184 A1 | 12/2006 |
| WO | 2007/011937 A2 | 1/2007 |
| WO | WO-2008/121566 | 10/2008 |
| WO | 2009/147548 A2 | 12/2009 |
| WO | 2010/099093 A1 | 9/2010 |

OTHER PUBLICATIONS

Lee, Youbok "Anntenna Circuit Design for RFID Applications", Microchip, AN710, 2003, Microchip Technology Inc., 50 pages.
International Search Report and Written Opinion received for the PCT Application No. PCT/US2010/025014, mailed on Apr. 15, 2010, 9 pages.

(56) References Cited

OTHER PUBLICATIONS

International Search Report received for PCT Application No. PCT/US2008/057588, mailed on Aug. 7, 2008, 1 page.
International Preliminary Report on Patentability and Written Opinion received for PCT Application No. PCT/US2008/057588, issued on Oct. 6, 2009, 6 pages.
International Search Report received for the PCT Application No. PCT/US2005/022993, mailed on Oct. 21, 2005, 3 pages.
International Preliminary Report and Written Opinion received for the PCT Application No. PCT/US2005/022993, issued on Dec. 4, 2006, 6 pages.
International Preliminary Report and Written Opinion on Patentability received for PCT Application No. PCT/US2005/019988, issued on Dec. 4, 2006, 9 Pages.
International Search Report received for PCT Application No. PCT/US2005/019988, mailed on Dec. 16, 2005, 5 pages.
International Search Report received for PCT Application No. PCT/US2006/027847, mailed on Mar. 29, 2007, 5 pages.
International Preliminary Report and Written Opinion received for PCT Application No. PCT/US2006/027847, issued on Jan. 22, 2008, 10 pages.
International Preliminary Report on Patentability and Written Opinion received for the US Patent Application No. PCT/US2006/013603, issued on Oct. 9, 2007, 7 pages.
International Search Report received for the PCT Application No. PCT/US2006/013603, mailed on Jan. 9, 2006, 3 pages.
International Preliminary Report on Patentability and Written Opinion received for PCT Application No. PCT/US2006/006361, issued on Aug. 28, 2007, 8 pages.
International Search Report received for the PCT Application No. PCT/US2006/006361, mailed on Sep. 22, 2006, 4 pages.

\* cited by examiner

MEMORY CARD BASED CONTACTLESS DEVICES

FIELD

The present invention relates generally to contactless devices, and more specifically to contactless devices within memory cards.

BACKGROUND

Contactless devices like contactless smartcards are being widely used for financial transactions, the most common of transactions being payments. Examples of such cards include Visa's PayWave, MasterCard's PayPass and American Express's Express Pay.

While usage of contactless devices such as smartcards seems to be growing, there is growing concern about security in usage of such devices. Generally, smartcards get activated by a reader when a user takes the smart card in proximity to a reader where the RF (radio frequency) antenna of the reader activates the RF antenna attached to the contactless device. In certain circumstances, it is possible that smartcards can get activated by a contactless reader in close proximity without the knowledge of user.

NFC technology allows for secure transactions by using a security element such as a SIM card, a secure flash card, or an embedded security controller. Devices with NFC technology or other such short range communication technologies integrated in mobile devices create a strong tie-up for the consumer with the specific mobile device company. For example, if we consider the case of a bank providing contactless access to several of its services via mobile phones, the users of such services need to have mobile phones from specific phone companies that the bank has tied up with.

Hence there is a need for a methodology where existing contactless infrastructure can be used to provide an environment where usage of contactless devices is secure and flexible. Further objects, features and advantages will become apparent from the following description, claims and drawings.

DESCRIPTION OF EMBODIMENTS

Figure 1:
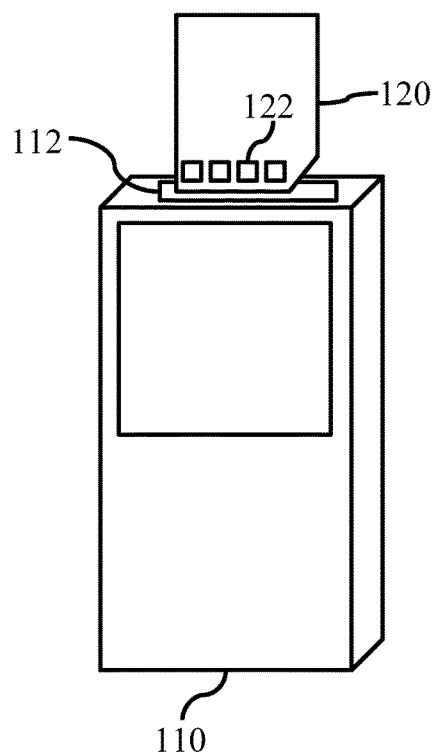
FIG. 1 shows a mobile computing device and a token compatible with a memory card slot.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a mobile computing device and a token compatible with a memory card slot. Mobile computing device 110 is shown as a mobile phone in FIG. 1, but this is not a limitation of the present invention. For example, mobile computing device 110 may be a personal digital assistant (PDA), a smartphone, a mobile phone, a handheld computer, or any other device capable of operating as described herein. Mobile computing device 110 includes memory card slot 112. Memory card slot 112 is a slot capable of accepting token 120. For example, memory card slot 112 may have physical dimensions compatible with token 120, and may have a communications interface that operates using a protocol compatible with token 120. The memory card slot 112 is a memory card slot designed to accept and communicate with memory cards. As used herein, the term "memory card slot" refers to any add-on slot capable of accepting a card having memory accessible by a mobile computing device such as that shown in FIG. 1. For example, a memory card slot may be compatible with an industry standard communications protocol, or may be compatible with a widely accepted communications protocol that is not necessarily formally documented as an industry standard. Examples include slots that are compatible with the Multimedia Memory Card (MMC) protocol, Memory Stick DUO protocol, secure digital (SD) protocol, and Smart Media protocol. The foregoing list is meant to be exemplary, and not exhaustive. Memory card slot 112 may be compatible with many memory card slot protocols other than those explicitly listed above. Token 120 includes electrical contacts 122 as part of a host interface that communicates with memory card slot 112. In some embodiments, token 120 includes a "contactless" interface to communicate with memory card slot 112. For example, electronic token 120 may include an interface to memory card slot 112 that communicates using electric or magnetic fields, infrared (IR) light or any other suitable communications mechanism.

Token 120 may include memory and may also include additional functionality. In some embodiments, token 120 includes memory accessible by mobile computing device 110 and also includes additional functionality. In other embodiments, token 120 does not include memory accessible by mobile computing device 110. The additional functionality of token 120 may take any form and the various embodiments of the present invention are not limited in this regard. In various embodiments of the present invention, the additional functionality in token 120 is accessed by mobile computing device 110 using memory card access commands already defined for use in memory card slot 112. Accordingly, the various embodiments of the present invention enable the implementation of token functions beyond memory accesses without defining new commands.

Figure 2:
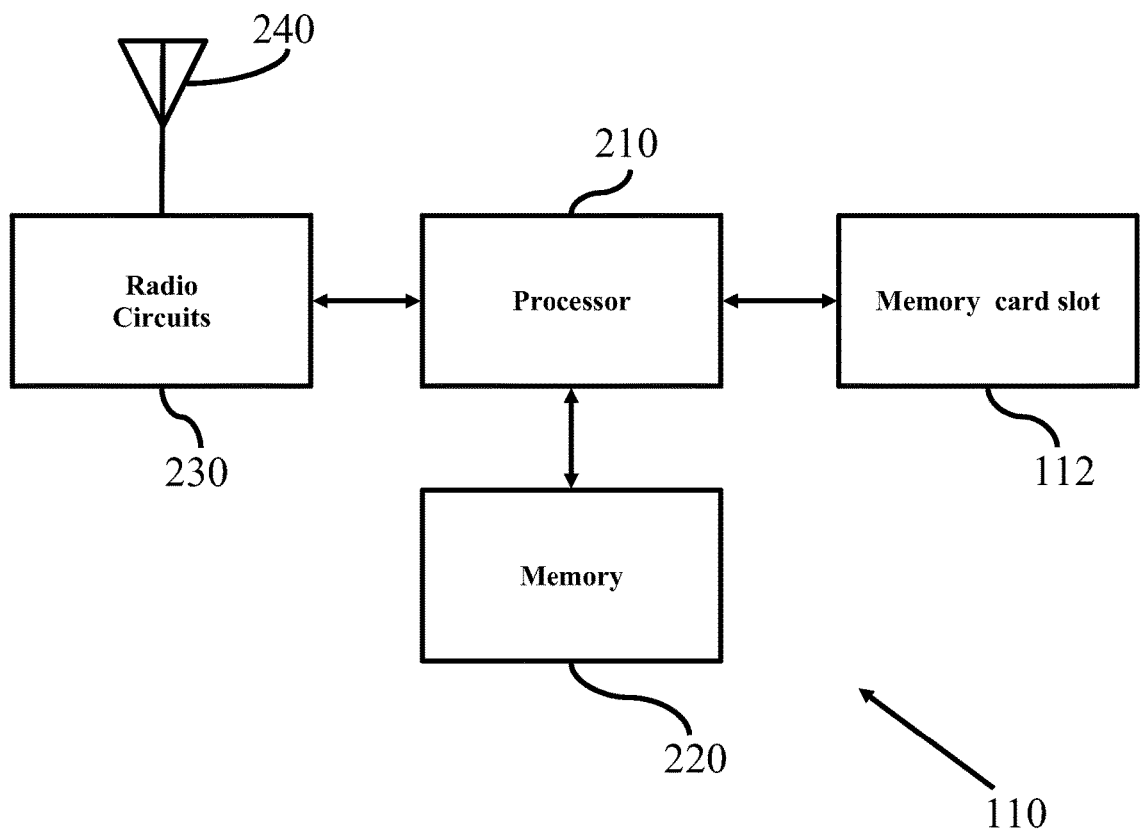
FIG. 2 shows a block diagram of a mobile computing device.

FIG. 2 shows a block diagram of a mobile computing device. Mobile computing device 110 includes antenna 240, radio circuits 230, processor 210, memory 220, and memory card slot 112. For example, antenna 240 and radio circuits 230 may be utilized to communicate with a cellular telephone network. Further, in some embodiments, mobile computing device 110 is a wireless local area network (WLAN) or wireless wide area network (WWAN) device. For example, antenna 240 and radio circuits 230 are utilized to communicate with a wireless access point. Processor 210 represents a processor capable of communicating with the other blocks shown in mobile computing device 110. For example, processor 210 may be a microprocessor, a digital signal processor (DSP), a microcontroller, or the like. Further, processor 210 may be formed from state machines or other sequential logic. In operation, processor 210 may read instructions from memory 220 and perform actions in response thereto. For example, processor 210 may execute program instructions that influence communications between mobile computing device 110 and a device coupled to memory card slot 112.

Memory card slot 112 is described above with reference to FIG. 1. Memory card slot 112 includes circuitry compatible with token 120. Mobile computing device 110 may communicate with token 120 by using a standard set of memory card access commands. For example, processor 210 may use memory card write commands to write to memory in token 120, and may use memory card read commands to read from memory in token 120. Mobile computing device 110 accesses additional functionality in token 120 using "hidden" commands embedded in memory card access commands.

Figure 3:
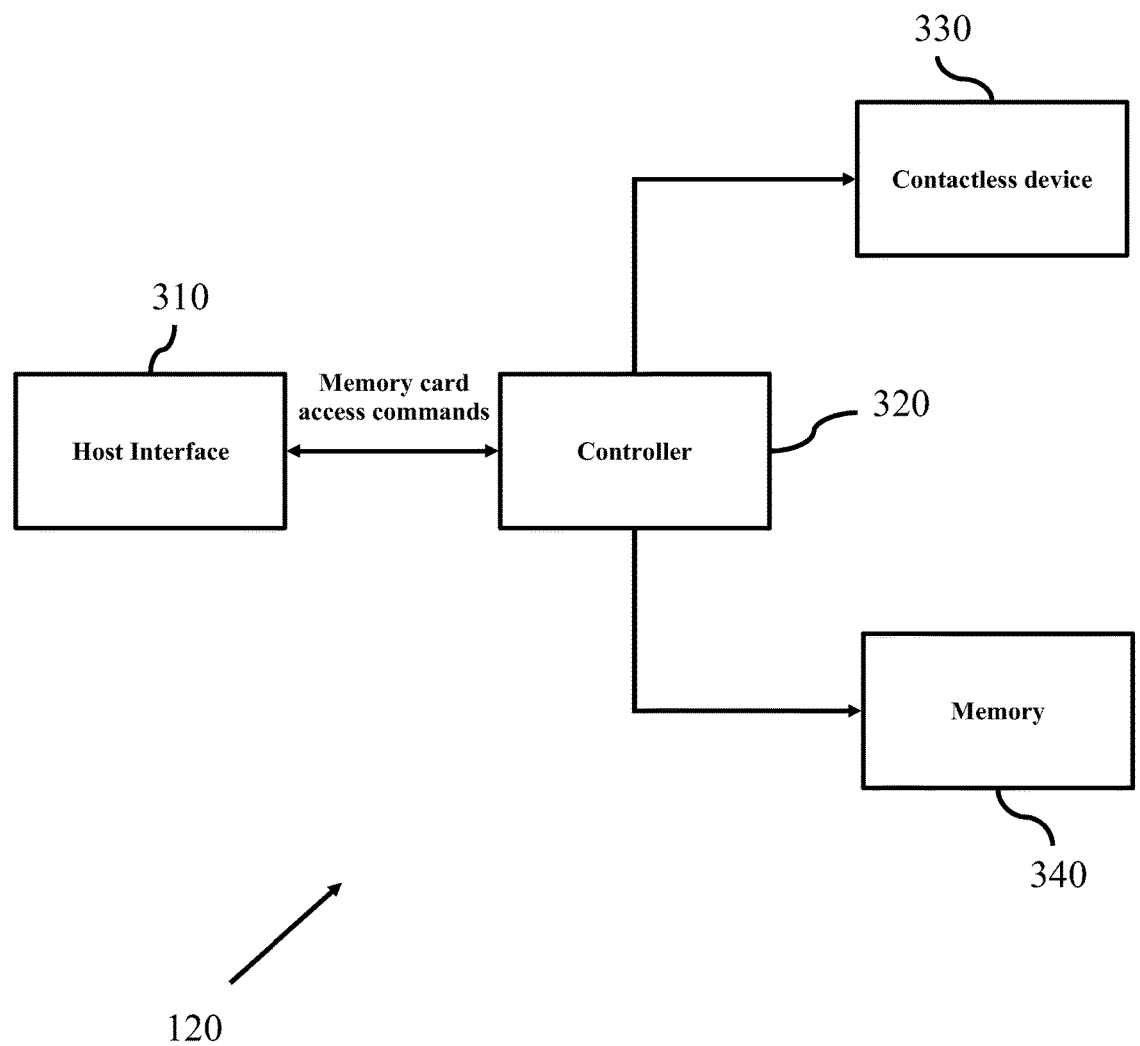
FIG. 3 shows a block diagram of a token that communicates with a memory card slot in a mobile computing device.

FIG. 3 shows a block diagram of a token that communicates with a memory card slot in a mobile computing device. Token 120 includes the host interface 310, memory card controller 320, memory 340 and the contactless device module 330. Token 120 may be any type of token capable of communicating with a memory card slot in a mobile computing device. Memory 340 may be any type of volatile or non-volatile memory. For example, memory 340 may be volatile memory such as static random access memory (SRAM) or dynamic random access memory (DRAM). Also for example, memory 340 may be nonvolatile memory such as NOR FLASH memory or NAND FLASH memory. In various embodiments of the present invention, memory 340 represents memory that is accessed by a mobile computing device using memory card access commands defined for that purpose. Host interface 310 includes electrical contacts to interface with a memory card slot 112. For example, in some embodiments, host interface 310 includes contacts such as contacts shown in (FIG. 1). Also for example, in some embodiments, host interface 310 includes recessed electrical contacts. Host interface 310 may also include circuitry such as drivers, receivers, terminations, and the like. The user communicates data between the mobile computing device 110 and memory card controller 320 using the host interface 310. Data between the memory card controller 320 and the host interface 310 is communicated using memory access commands. Memory cards write command includes a unique data string to identify the memory card write command as a command to be diverted for purposes other than a memory write. In addition, the sector address provided with the memory card write command may be set to a particular address value to further identify the memory card write command as a command to be diverted. These commands are diverted to the contactless device 330 by the memory card controller. In addition to specific address/data values to identify the memory card access command as a command to be diverted for a purpose other than a memory access, the memory access command may include data bits to further specify the type and function of hidden command. New commands for the memory card controller are embedded inside the data bits subsequent to memory card read/write commands. The memory card controller 320 then decides if the incoming data bits are meant for regular read/write functions or for the contactless device 330 functions.

Figure 4:
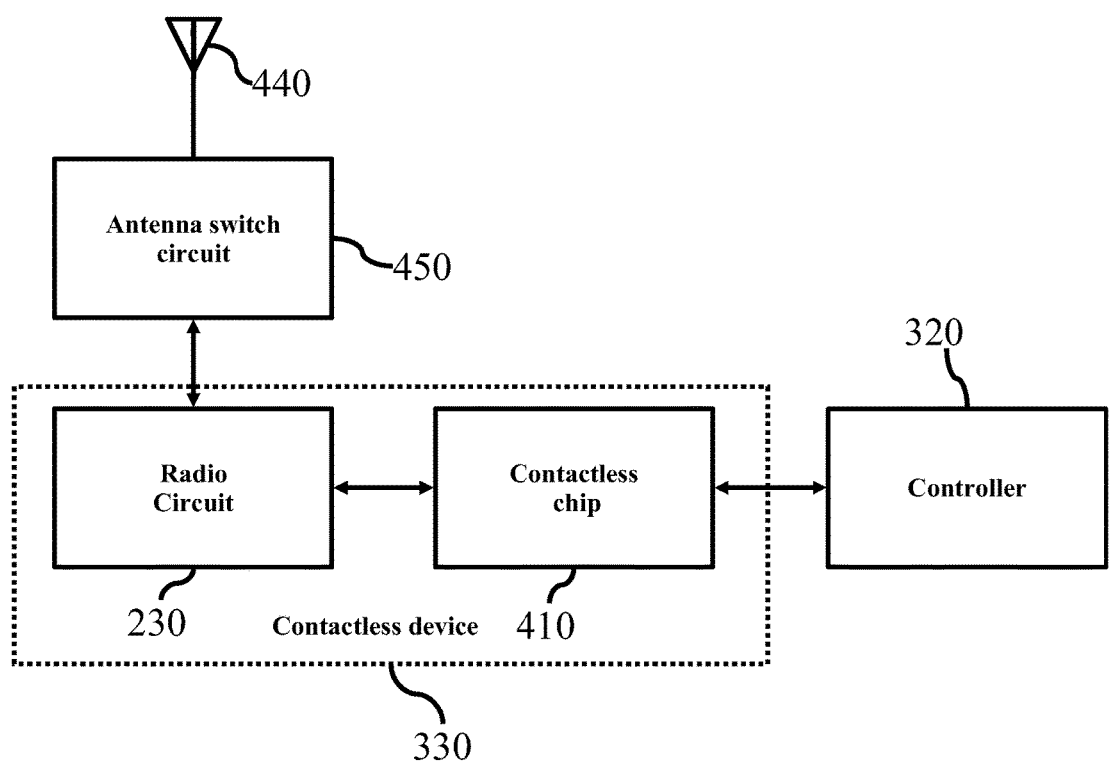
FIG. 4 shows a contactless device.

FIG. 4 shows a block diagram of a contactless device 330 in accordance with various embodiments of the invention. The contactless device 330 contains a contactless chip 410, radio circuits 230 and an antenna 440. The contactless chip 410 may have data embedded on to it and may communicate to the device they are connected. For example, the contactless chip 410 may have account information related to one payment account. In other embodiments, the contactless chip 410 can have information related to multiple payment accounts. The antenna 440 and radio circuits 230 may be utilized to communicate with third party readers. In some embodiments, the radio circuits 230 and the antenna 440 may be connected through an antenna switch circuit 450 (or antenna switch, as used interchangeably) that enables activating or deactivating the antenna 440 based on user commands. In some embodiments, user may provide a command to activate the antenna 440 through the antenna switch 450. Once the antenna switch 450 is turned ON, the antenna 440 is activated and the user can use the token to communicate with a third party reader. In some embodiments, based on user commands, the antenna switch may be turned ON for a pre-determined duration. The antenna switch 450 may be turned OFF by another user command or the switch 450 may be turned OFF automatically after a pre-determined duration. The user commands are communicated to the contactless chip 410 using the controller 320, where the commands are for non-memory functions. The controller 320 authenticates the user to access the contactless device 330 and allows contactless device 330 functions. All commands passed through the data stream to the contactless chip 410 are authenticated by the controller 320.

Figure 5:
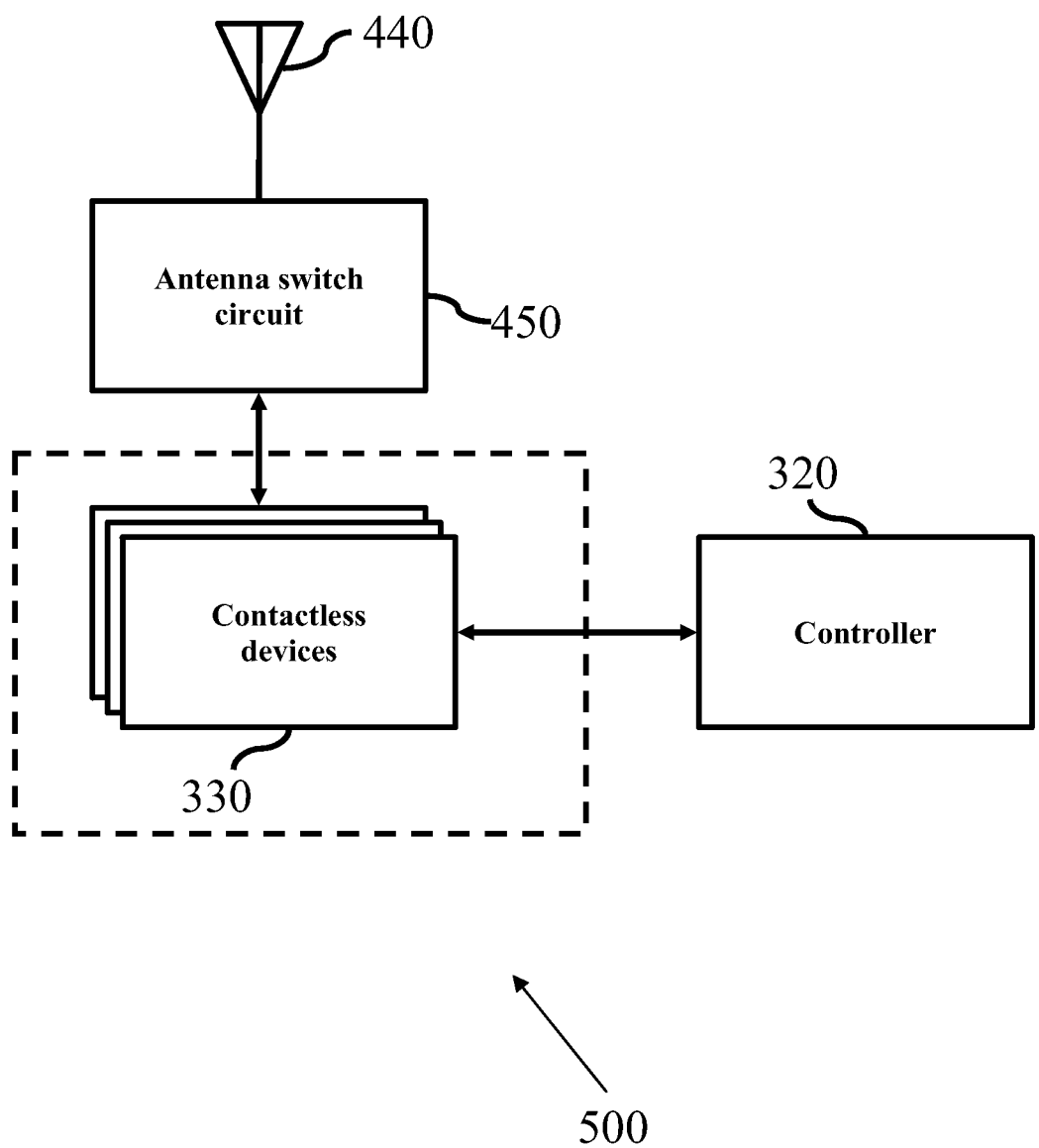
FIG. 5 shows multiple contactless devices connected to a single antenna switch circuit.

FIG. 5 shows multiple contactless devices 500, an antenna 440, and an antenna switch circuit 450. Multiple contactless devices 500 can share the radio circuits and antenna. In some embodiments of the present invention, different payment accounts may be stored in different contactless devices 330. In some other embodiments, the contactless devices 330 can be assigned for different institutions to transact. The antenna switch circuit 450 as shown also includes the radio circuit 230 shown in FIG. 2. In some other embodiments, the antenna switch circuit may be separated from the radio circuit. The data sent by user in the form of hidden commands in the memory access command is passed through the memory card controller 320. The memory card controller 320 authenticates the user to access the contactless payment device 330 and allows non-memory functions. In some embodiments, user may provide a command to identify and connect a particular contactless device to the antenna through the switch circuit. Once the antenna switch 450 is turned ON, the antenna is activated and the user can use the token to communicate with a third party reader. In some embodiments, based on user commands, the antenna switch may be turned ON for a pre-determined duration. The antenna switch 450 may be turned OFF by another user command or the switch 450 may be turned OFF automatically after a pre-determined duration. In various embodiments, contactless devices 330 may also be powered by battery of a mobile computing device 110 besides an external reader.

Figure 6:
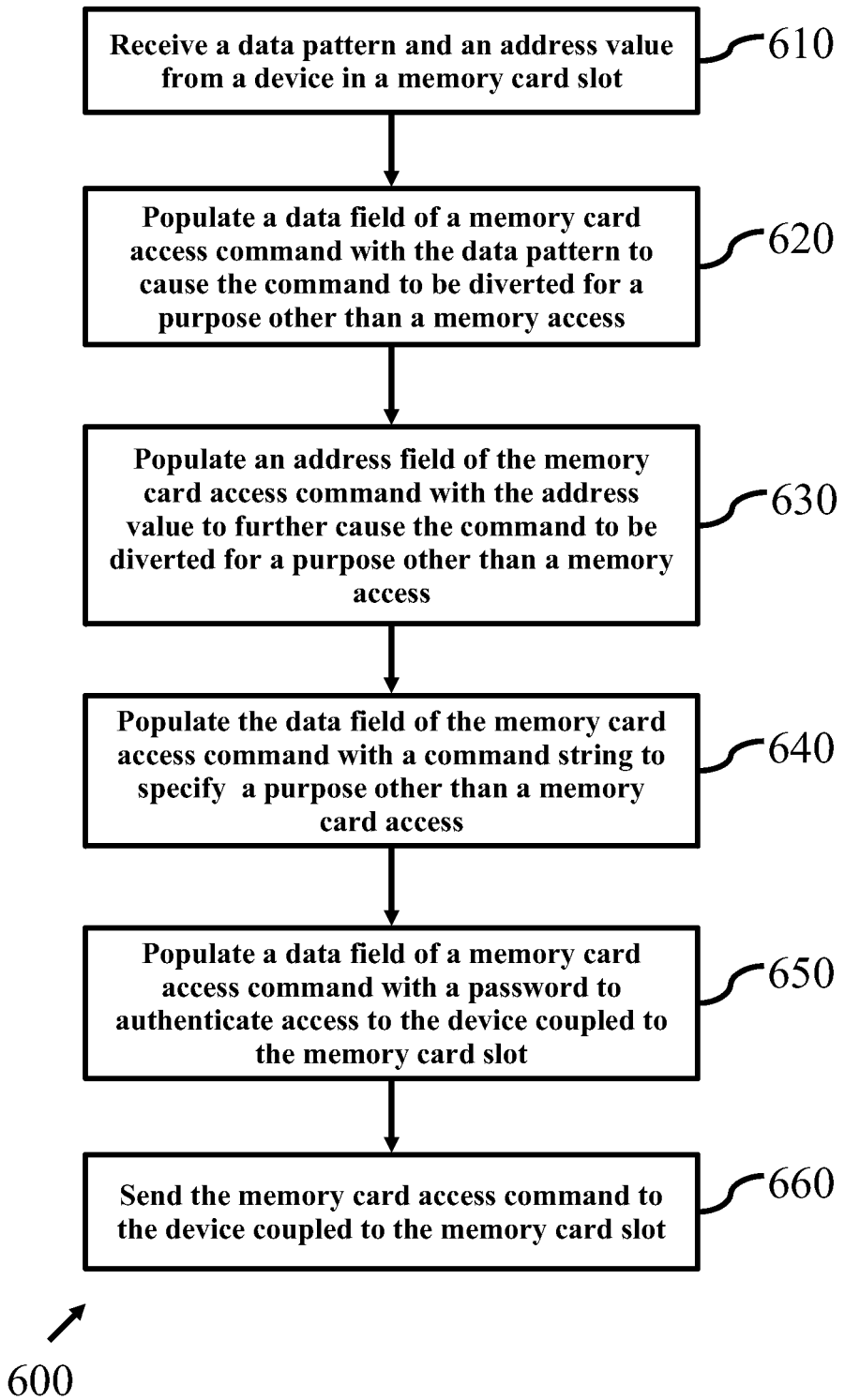
FIG. 6-8B show flowcharts of methods in accordance with various embodiments of the present invention.

FIG. 6 shows a flowchart in accordance with various embodiments of the present invention. Method 600 is used by a mobile computing device to communicate with a contactless device in a memory card slot. The various actions in method 600 may be performed in the order presented, in a different order, or simultaneously. Further, in some embodiments, some actions listed in FIG. 6 are omitted from method 600. Method 600 begins at 610 in which a data pattern and an address value are received from the device in a memory card slot. The data pattern corresponds to the hidden command data value, and the address value corresponds to the hidden command address value. In some embodiments, the mobile device only receives the data value and in other embodiments, the mobile device only receives the address value. In some embodiments, the actions of 610 may occur once when the device is first inserted in the memory card slot. The mobile computing device may then use the address and data values each time it creates a hidden command. In other embodiments, the actions of 610 may occur each time the device is inserted in the memory slot. In still further embodiments, the actions of 610 may occur periodically. Each time the actions 610 occur, the data pattern may be the same or different, and the address value may be the same or different. At 620, a data field of a memory card access command is populated with the data pattern to cause the command to be diverted for a purpose other than a memory access. At 630, an address field of the memory card access command is populated with the address value to further cause the command to be diverted for purposes other than a memory access. In some embodiments, only one of 620 or 630 is utilized. In these embodiments, the presence of a hidden command is signified by the data pattern alone, or the address value alone. At 640, the data field of the memory card access command is populated with a command string to specify a purpose other than a memory card access. The command string written in the data field is for the non memory function module. At 650, the data field of a memory card access command is populated with a password to authenticate access to the device coupled to the memory card slot. In some embodiments, a password is included in the data field for every hidden command. In other embodiments, a password is only included at the beginning of an exchange. At 660, the memory card access command is sent to the device coupled to the memory card slot. For example, a mobile computing device (110, FIG. 1) may send the memory card access command to a token (120, FIG. 1) in a memory card slot (112, FIG. 1). The token may include a memory card controller (320, FIG. 3) to divert the command based on the data fields populated in method 600.

Figure 7:
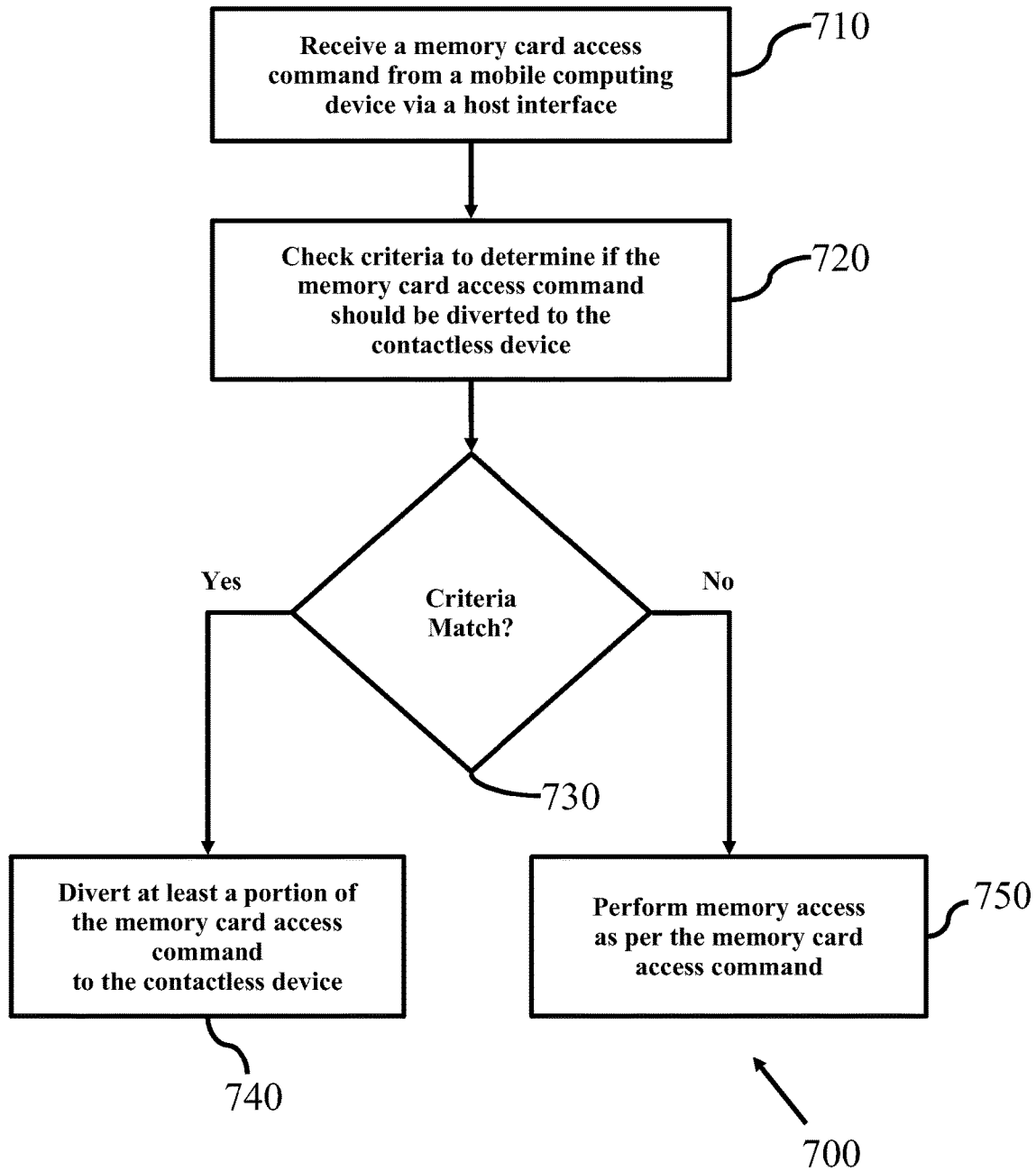

FIG. 7 shows a flowchart in accordance with various embodiments of the present invention. In some embodiments, method 700 may be used by token 120 in a memory card slot 112. In some embodiments, method 700, or portions thereof, is performed by a command routing component within a token, and in other embodiments, method 700, or portions thereof, is performed by software. The various actions in method 700 may be performed in the order presented, in a different order, or simultaneously. Further, in some embodiments, some actions listed in FIG. 7 are omitted from method 700. In some embodiments the method 700 is used by the memory card controller 320 to decide if the memory access command is for the contactless device 330 to perform non-memory functions or for general memory 340 functions. In some embodiments, the method 700 or portions thereof, is performed by software. Method 700 begins at 710 when the memory card controller 320 receives memory access command from the mobile computing device 110 via a host interface 310. The actions of 710 correspond to a token in a memory card slot of a mobile computing device receiving a memory card access command. The memory access command communicates between the host interface and the memory card controller 320. Commands are hidden in the memory access command, in either the address field or the data field or both. At 720, the token checks for criteria in the memory access command to determine if the memory access command should be diverted to the contactless device 330. At 730, the criteria is matched which may be one or both of a hidden command data value, a hidden command address value, or both. If there is a criteria match at 730, then a hidden command is present, and at least a portion of the memory card access command is diverted to contactless device at 740. If there is not a criteria match, then no hidden command is present, and a memory access is performed at 750.

Figure 8A:
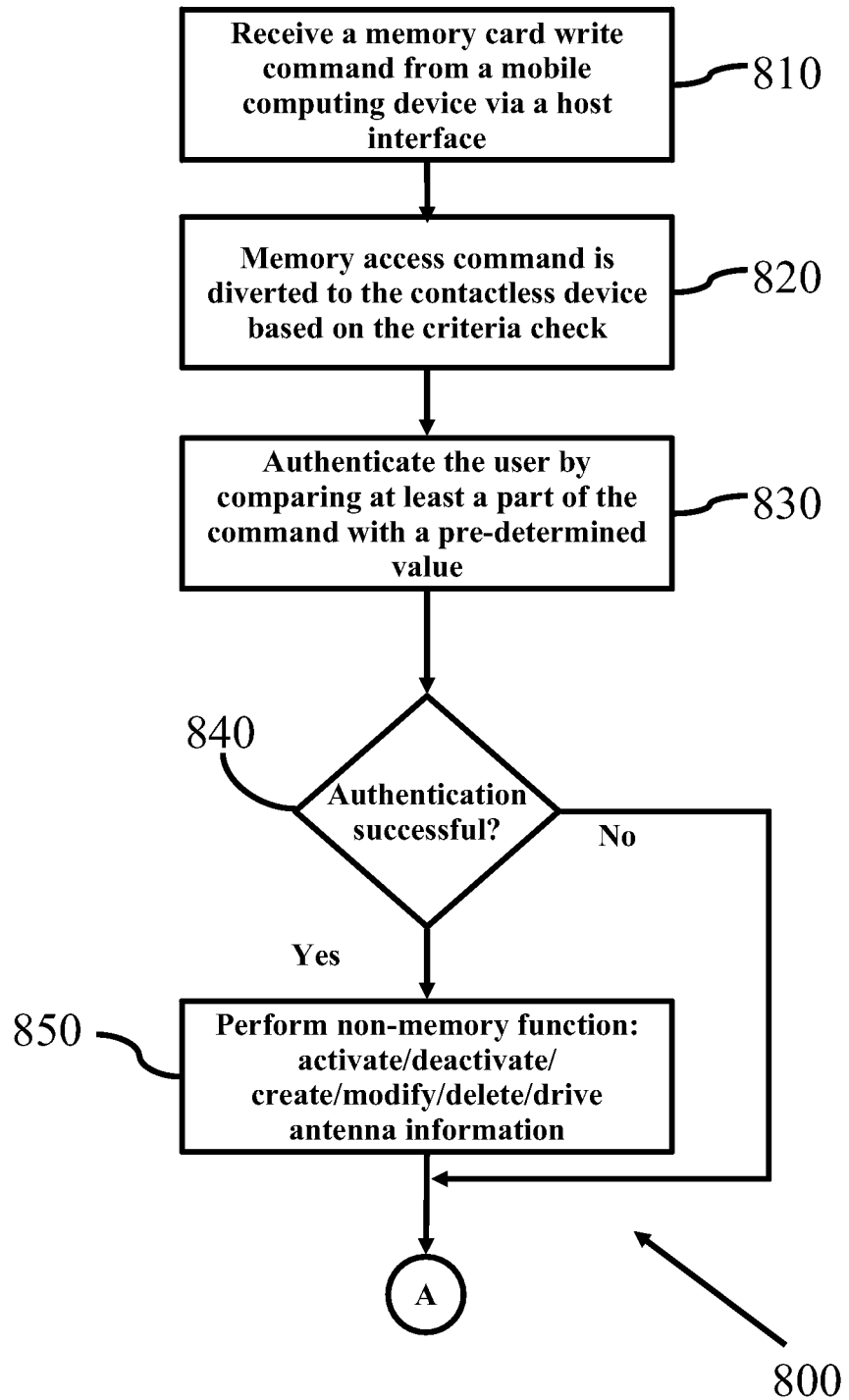
Figure 8B:
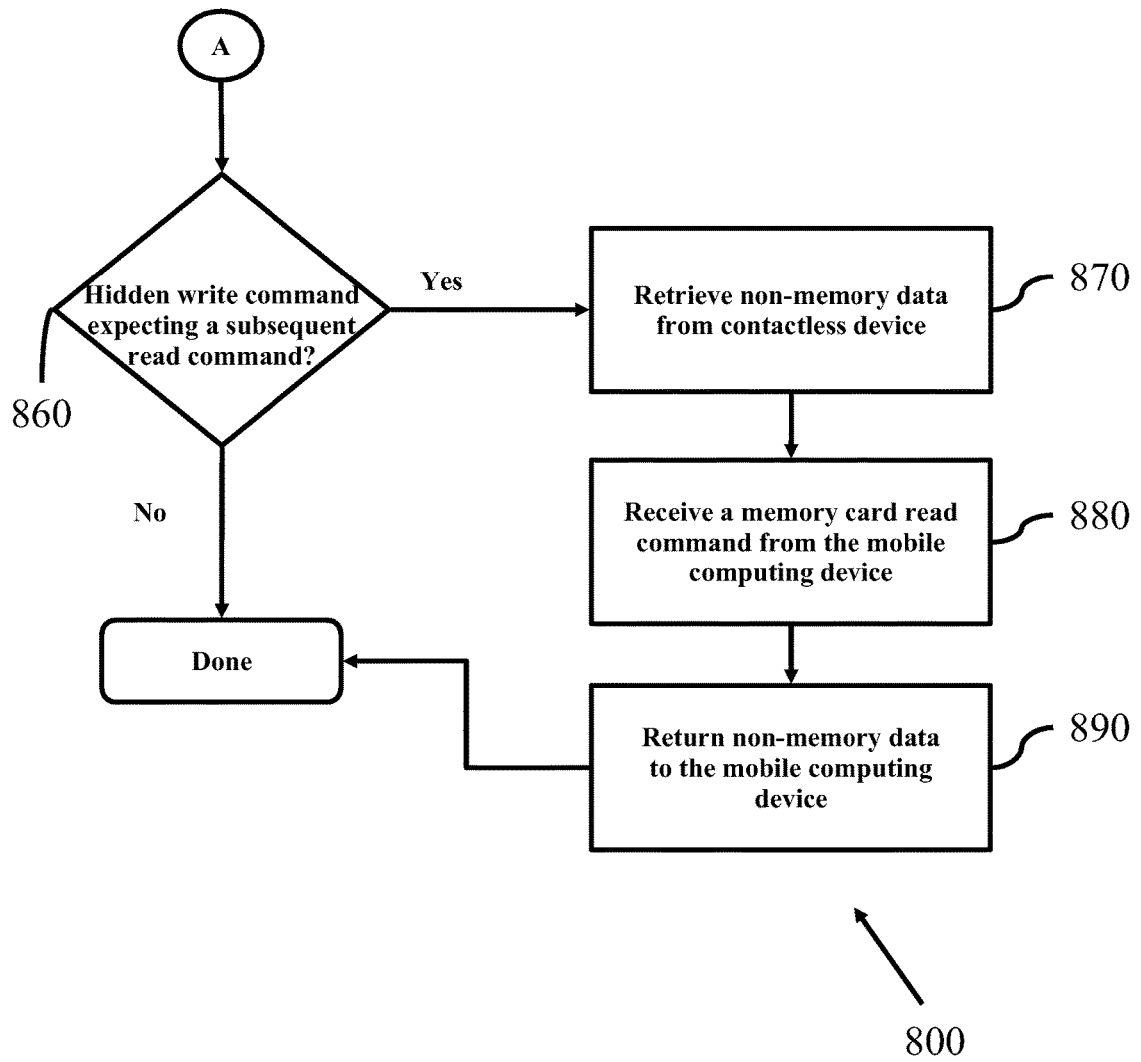

FIGS. 8 and 8A show a flowchart in accordance with various embodiments of the present invention. In some embodiments, method 800 may be used by token 120 in a memory card slot 112. In some embodiments, method 800, or portions thereof, is performed by a command routing component within a token, and in other embodiments, method 800, or portions thereof, is performed by software. The various actions in method 800 may be performed in the order presented, in a different order, or simultaneously. Further, in some embodiments, some actions listed in FIGS. 8 and 8A are omitted from method 800.

Method 800 begins at 810 when the memory card controller 320 receives memory access command from the mobile computing device 110 via a host interface 310. The actions of 810 correspond to a token in a memory card slot of a mobile computing device receiving a memory card access command. The memory access command communicates between the host interface and memory card controller. Commands are hidden in the memory access command, in either the address field or the data field or both. At 820, the memory card controller checks the data stream for hidden commands in the data field, address field or both. This is explained in method 700. At 830, when commands are diverted to the contactless device 330, a user authentication is performed by checking a part of the command with a pre-determined value. In case of successful authentication at 840 the command is diverted to contactless device allowing user to perform non-memory functions. Non-memory functions may include activating or deactivating the antenna 440 and creating, modifying or deleting accounts. The non-memory functions are enabled through a mobile computing device via the host interface at 850. If the hidden command is determined to be a "read" at 860, processing continues at 870; otherwise, the hidden command processing is done. At 870, the controller 320 retrieves data from the contactless device 330, and at 880, a memory card read command is received from the mobile computing device. At 890, the data from the contactless device 330 is returned to the mobile computing device.

Figure 9:
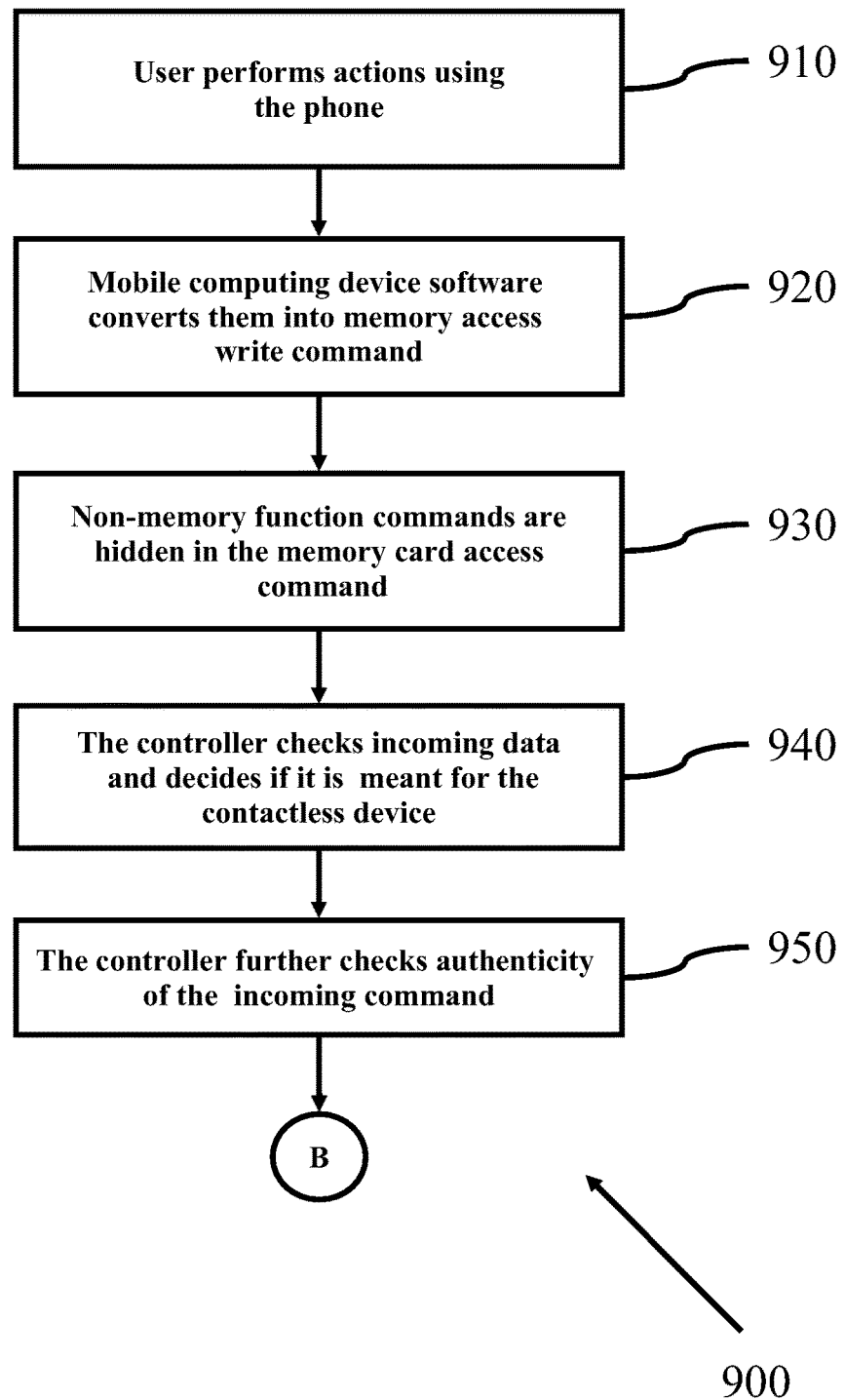
FIG. 9-12 show flowcharts of methods in accordance with various embodiments of the present invention.

FIG. 9 shows a flowchart in accordance with various embodiments of the present invention. Method 900 begins at 910 with the user performing actions on the mobile computing device 110. At 920, software in the mobile computing device 110 converts these actions into memory card access write commands. Contactless device 330 related commands are "hidden" in the memory card write command at 930. At 940, the memory card controller checks the incoming data and decides if it is meant for the contactless device 330. Commands are hidden in the memory access command, in either the address field or the data field or both. In some embodiments the hidden command may also contain a password for authentication. The memory card controller checks the data stream for hidden commands in the data field, address field or both. If the data stream is found to contain hidden commands, the hidden command is authenticated at 950. For example, authentication is performed by checking a part of the command with a pre-determined value. In some embodiments, this pre-determined value may be a password. Further, a portion of the memory access commands is diverted to the contactless device 330 else the memory access command is performed.

Figure 10:
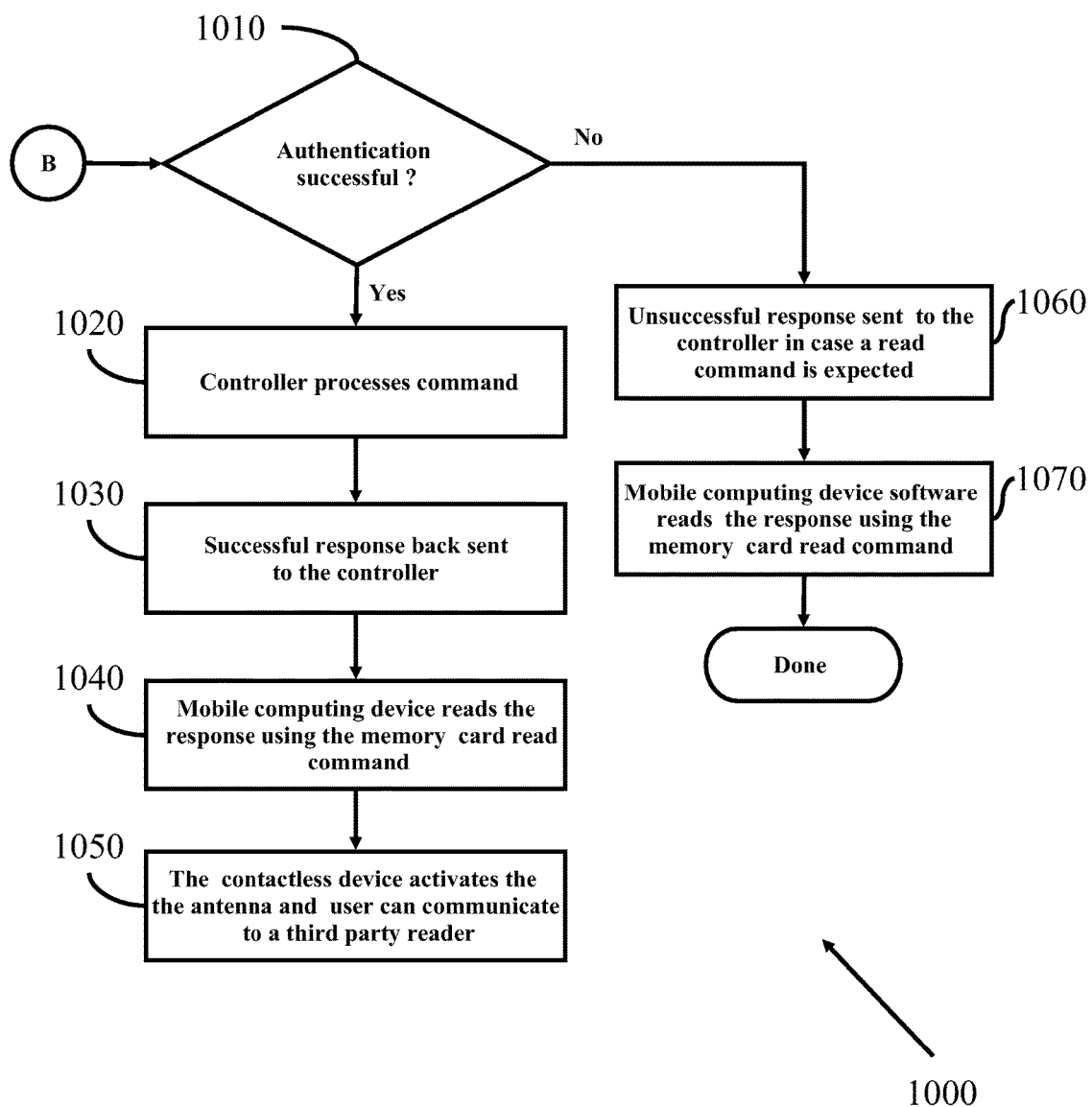

In case of successful authentication at 1010, shown in FIG. 10, the controller 320 processes the command at 1020. A successful response is sent back to memory card controller at 1030. At 1040, the mobile computing device 110 software reads the response using the memory card read command. The controller 320 activates the antenna 440 by connecting the antenna switch 450 to a contactless device 330 for a pre-determined duration at 1050. In case of unsuccessful authentication at 1010, an unsuccessful response is sent to the memory card controller 320 if a read command is expected at 1060. At 1070, this response is communicated to the user by the mobile computing device 110 software which reads the response for memory access read command.

Figure 11:
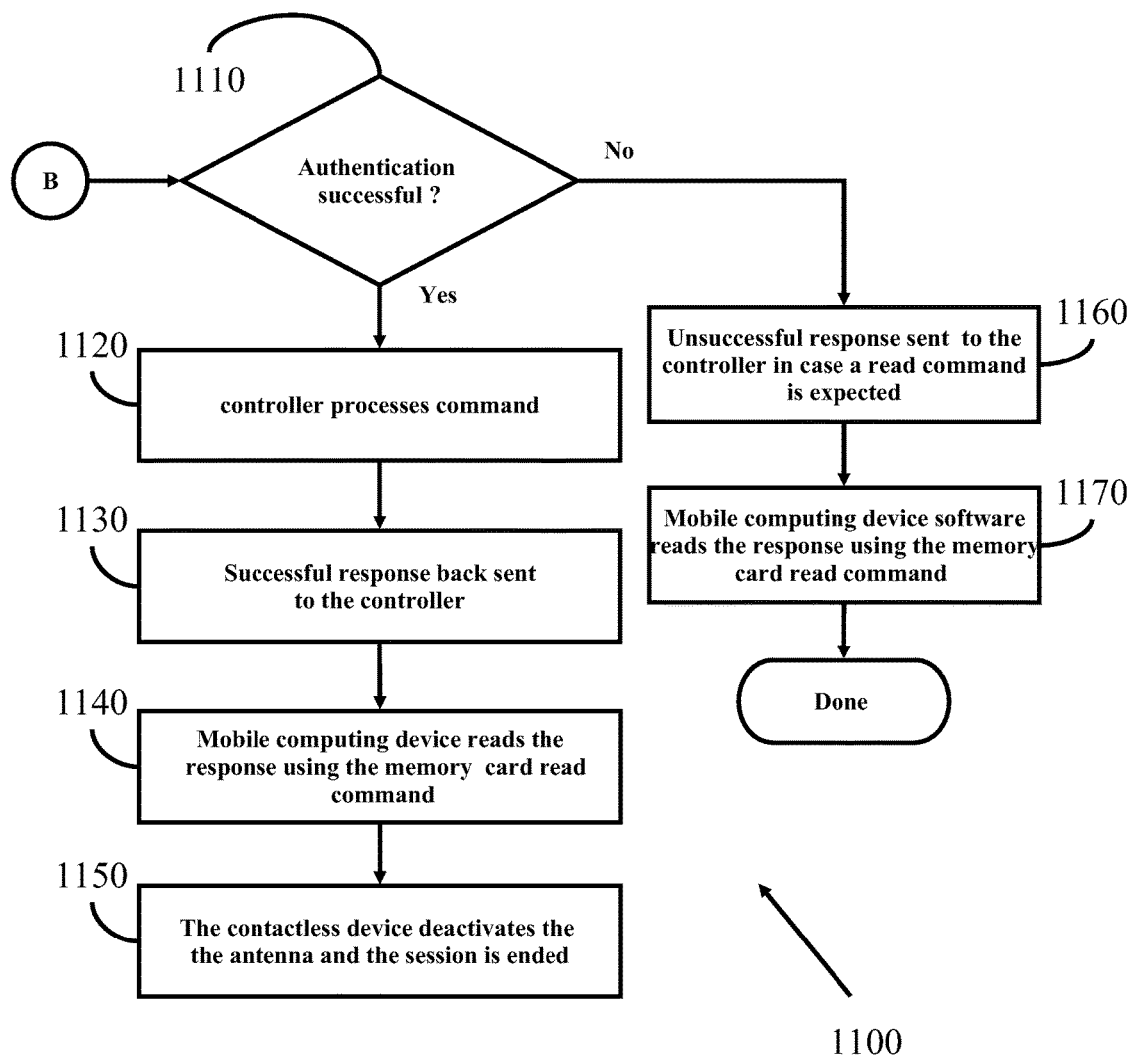

FIG. 11 shows the flow for deactivation of a contactless device. In case of successful authentication at 1110, shown in FIG. 11, the controller 320 processes the command at 1120. A successful response is sent back to memory card controller at 1130. At 1140, the mobile computing device 110 software reads the response using the memory card read command. The controller 320 deactivates the antenna 440 by connecting the antenna switch 450 to a contactless device 330 for a pre-determined duration at 1150. In case of unsuccessful authentication at 1110, an unsuccessful response is sent to the memory card controller 320 if a read command is expected at 1160. At 1170, this response is communicated to the user by the mobile computing device 110 software which reads the response for the memory access read command.

Figure 12:
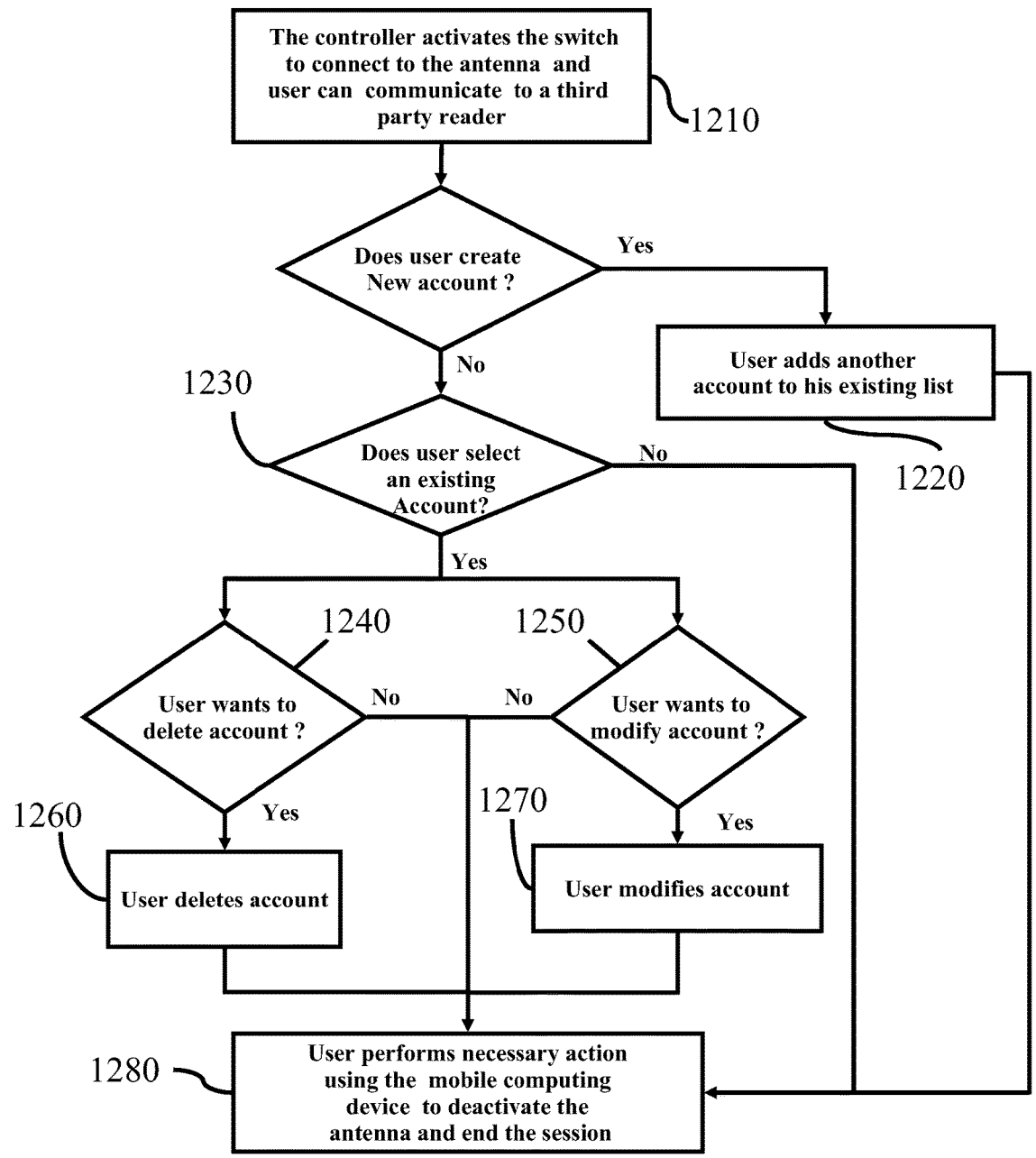

FIG. 12 shows a flowchart of methods in accordance with various embodiments of invention. At 1210, the controller 320 activates the antenna switch 450 to connect to the antenna 440 and user can communicate to a third party reader. In case the user wants to create a new account at 1210, the user can create one and add to the existing accounts at 1220, else he can select an existing account at 1230. The user now has options to delete or modify the selected account at 1240 and 1250 respectively. The user may choose to perform either of the actions of deleting a selected account or modifying a selected account at 1260 and 1270 respectively. The changes in account information get stored in the contactless device 330 as part of steps at 1260 and 1270. At 1280, the user can perform necessary action using the mobile computing device to deactivate the antenna and end the session at any stage. In some embodiments, deactivation happens after a pre-determined duration of time automatically.

In some embodiments, where multiple contactless devices 500 are present; each account may be associated with one contactless device 330. In some embodiments, more than one account may be associated to a single contactless device.

In other embodiments, the hidden commands may also be used to drive the antenna 440. The hidden commands may be used to send information to the antenna to enable reading by third party readers from the antenna. Readers will not be able to read from the antenna unless the antenna is activated by the user through a mobile computing device 110.

In some embodiments, the contactless devices 330 may have data connection where mobile computing devices 110 may be able to send commands with data to update the contactless device 330. In other embodiments, the contactless devices 330 may not have the data connection, where hidden commands are used only to activate or deactivate the antenna 440 connected to the contactless devices 330.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A memory card token comprising:
   a host interface that allows the memory card token to be accepted in a memory card slot;
   a radio circuit to transmit signals; and
   a controller coupled between the host interface and the radio circuit, wherein the controller is configured to determine if memory card compatible commands received over the host interface are meant to enable and disable an antenna connected to the radio circuit in response to the memory card compatible commands.

2. The memory card token of claim 1 wherein the controller is further configured to maintain financial account information.

3. The memory card token of claim 1 wherein the controller is configured to compare a data field of the memory card compatible commands to a hidden command data value that identifies the commands as non-memory commands.

4. The memory card compatible token of claim 3 wherein the controller is further configured to compare an address field of the memory card compatible commands to an address value that identifies the commands as non-memory commands.

* * * * *